United States Patent [19]

Senaratne

[11] Patent Number: 4,505,505
[45] Date of Patent: Mar. 19, 1985

[54] VACUUM DEVICE FOR LIFTING AN ARTICLE LOOSELY WRAPPED IN FLEXIBLE FILM

[75] Inventor: Gane W. Senaratne, Rancho Palos Verdes, Calif.

[73] Assignee: Airtec Industries, Long Beach, Calif.

[21] Appl. No.: 513,177

[22] Filed: Jul. 13, 1983

[51] Int. Cl.$^3$ ................................................ B66C 1/02
[52] U.S. Cl. ................................................... 294/64.1
[58] Field of Search ............... 294/64 R, 64 A, 64 B, 294/65, 86 R, 99 R, 92, 97, 105; 414/627, 737, 744 A, 744 B, 752; 271/103, 106

[56] References Cited

U.S. PATENT DOCUMENTS

| | | | |
|---|---|---|---|
| 3,207,325 | 10/1965 | Whallon et al. | 294/64 R |
| 3,656,794 | 4/1972 | McCord | 294/64 R |
| 3,934,916 | 1/1976 | Baker | 294/64 R |
| 4,006,929 | 2/1977 | Barker | 294/64 R |

FOREIGN PATENT DOCUMENTS 115183  11/1968  Norway ............................ 294/64 R Primary Examiner—James B. Marbert
Attorney, Agent, or Firm—Thomas A. Seeman

[57] ABSTRACT

A vacuum device for lifting an article such as a loaf of bread which is loosely wrapped in flexible film. A vacuum chamber in the device is provided with an anterior end wall that is ported for communication of the chamber with a vacuum source and with rigid diverging sidewalls that diverge from a protruding sidewall surface at the base of the chamber to the edge of the anterior end wall. When the article is lifted by the device, the diverging sidewalls are positioned in the path of the suspended film to cause the film to wrap around the sidewalls and the weight of the lifted article to forcibly urge the film into sealing contact with the protruding surface of the sidewalls as the film exits from the chamber. By urging the film into sealing contact with the sidewalls, the lifted article itself advantageously assists in maintaining the vacuum seal within the chamber. The vacuum chamber is sized and contoured for the film to be received within the chamber without being unduly stretched or permanently wrinkled.

12 Claims, 6 Drawing Figures

VACUUM DEVICE FOR LIFTING AN ARTICLE LOOSELY WRAPPED IN FLEXIBLE FILM

BACKGROUND OF THE INVENTION

This invention relates to devices for lifting an article by means of a vacuum and more particularly for lifting an article of the type that is loosely wrapped in flexible film such as bread and the like.

In lifting and transporting various articles, it is known to utilize a vacuum device commonly referred to as a "Vacuum Cup" or "Vacuum Pad". The devices ordinarily have a vacuum chamber with a lip as a seal for the vacuum. When the article is to be lifted, a vacuum is applied to the vacuum chamber, the lip is brought in contact with the article, and the article is then lifted and transported while being held to the device by the vacuum.

Such prior devices are generally suitable for lifting a rigid planar or contoured surface but not for lifting an article loosely wrapped in flexible film such as a loaf of bread. A problem with using known vacuum devices for lifting articles loosely wrapped in film is that it is either difficult to obtain an effective vacuum seal about the film so that the article may be lifted, or if a seal is obtained, the seal is lost by the film being peeled away from the walls of the vacuum chamber by the weight of the article. When the seal is lost, the article is dropped. Another problem with using known vacuum devices for lifting such articles is that the film may be permanently damaged by being stretched beyond its elastic limit or permanently wrinkled. Wrinkling of the film is undesirable as it may cause the film to become unsightly and resultantly cause any commercial article contained therein to be less saleable.

Therefore, it is the object of this invention to provide a vacuum device which will effectively lift an article loosely wrapped in flexible film.

Another object of this invention is to provide such a vacuum device in which the article being lifted will assist in maintaining a vacuum seal between the film and the walls of the chamber.

A further object of this invention is to provide such a vacuum device that will not damage or permanently wrinkle the film.

Another object of this invention is to provide such a vacuum device which is economical and feasible to manufacture.

BRIEF DESCRIPTION OF THE INVENTION

In accordance with the present disclosure, a vacuum device for lifting an article loosely wrapped in flexible film such as a loaf of bread and the like is provided. The device includes a vacuum chamber with an anterior end wall and with rigid opposing diverging sidewalls that diverge from a protruding surface at the entrance of the chamber to the edge of the anterior end wall. The chamber is in communication with the vacuum source through ports in the end wall.

When the film wrapping is engaged by the base of the chamber, the film is drawn into the chamber by the vacuum source and retained against the anterior end wall and over the sidewalls of the chamber. After the film is drawn into the chamber, the vacuum source is sealed by the contact of the film with the chamber walls. Thereafter, when the article is lifted by the device, owing to the position of the sidewalls in the path of the suspended film, the film is caused to wrap toward and around the diverging sidewalls as the film exits from the chamber, and the weight of the lifted article forcibly urges the film into sealing contact with the protruding surface of the sidewalls. The lifted article thereby assists in maintaining the vacuum seal within the vacuum chamber rather than acting in a manner that would peel the film away from the chamber walls and break the seal. The diverging sidewalls also function as a shelf for assisting the vacuum source in supporting the film and included article.

The anterior end wall is positioned at a predetermined distance adjacent to the chamber opening and the chamber is sized to engage the film without unduly stretching and thereby damaging the film.

It is preferable, although not necessary, to have the cross-sectional shape of the vacuum chamber conform to the relative shape of the wrapped article being lifted. For example, in lifting an article such as a loaf of bread, it is desired that the chamber have an opening that is relatively long and narrow; whereas for lifting articles such as tortillas, it is desirable to have a circular opening. Two such embodiments are illustrated in the drawings.

In the rectangular embodiment, it was found that the film wrapping would tend to permanently wrinkle after the article was lifted where the film contacted the corners at the opening of the chamber. This made the wrapping unsightly. To overcome this problem, the corners of the chamber are rounded and the walls adjacent to the short end of the chamber opening are flared and chamfered in this embodiment.

The device may also be constructed with additional vacuum ports along the upper portion of the diverging sidewalls, if desired.

Owing to the simplicity of construction, the device is particularly feasible and economical to manufacture.

BRIEF DESCRIPTION OF DRAWINGS

For a fuller understanding of the nature and objects of the invention, reference should be made to the following detailed description taken in connection with the accompanying drawing, in which.

Similar reference characters refer to similar parts throughout the several views of the drawings.

DETAILED DESCRIPTION OF PREFERRED EMBODIMENTS

The invention accordingly comprises the features of contruction, combination of elements and arrangements of parts which are exemplified in the construction hereafter set forth, and the scope of the invention will be indicated in the claims.

Figure 1:
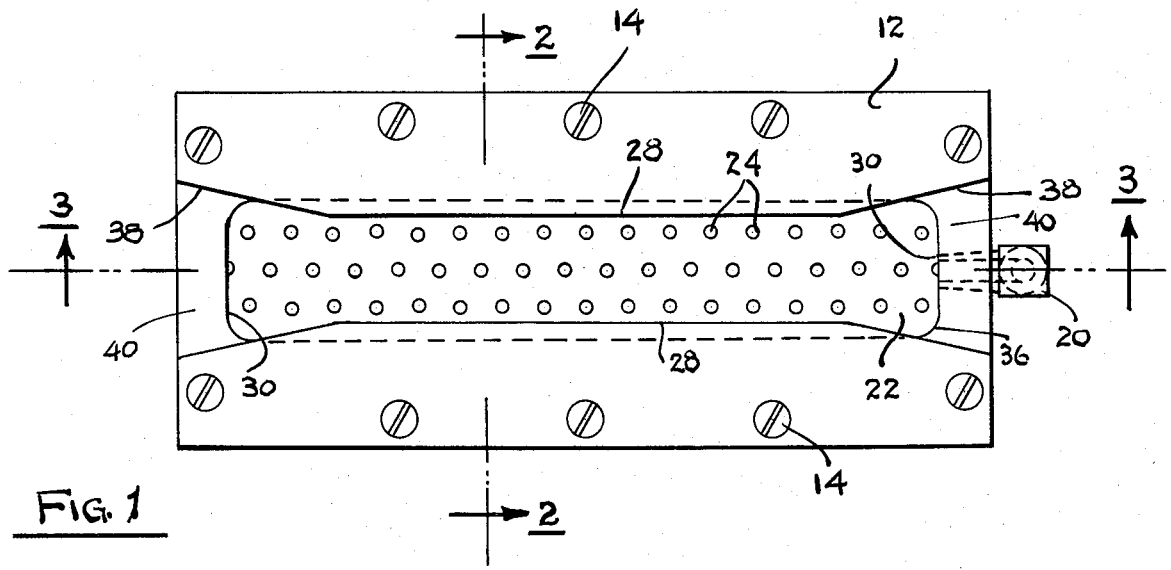
FIG. 1 is a bottom plan view of a preferred embodiment of the device with the opening of the vacuum chamber facing the viewer.
Figure 2:
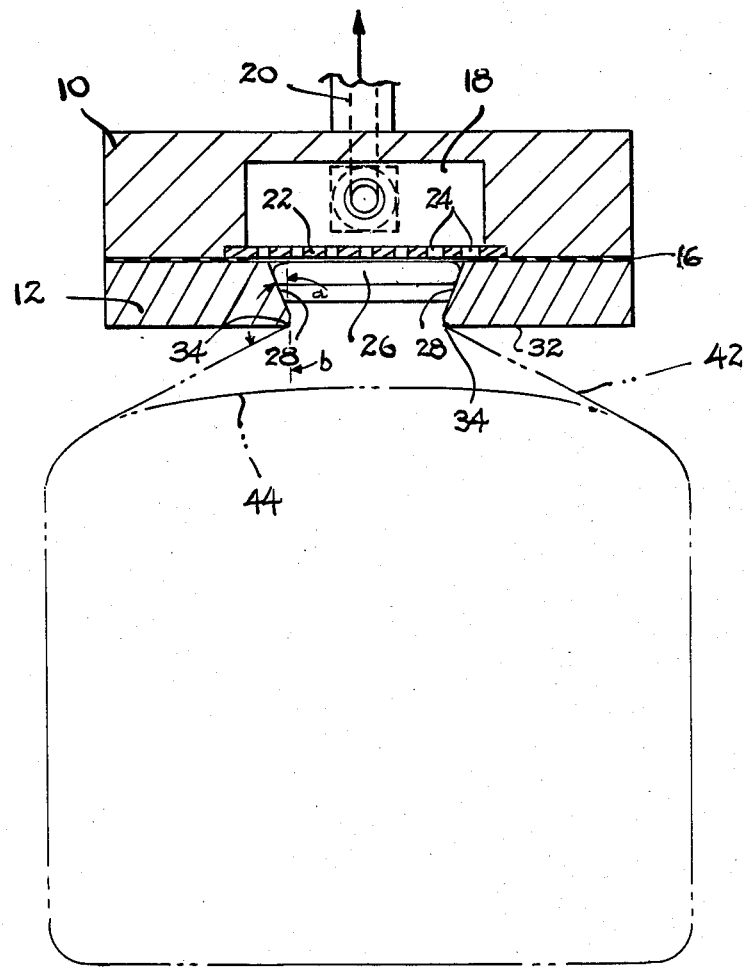
FIG. 2 is a cross-sectional view of the device taken along the line 2—2 of FIG. 1 and illustrating the manner in which the device engages the film-wrapping of loosely wrapped article.
Figure 3:
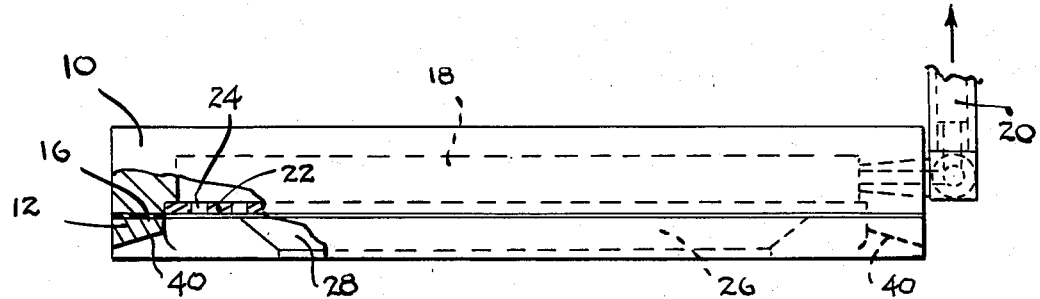
FIG. 3 is a side elevational view of the device partially in cross-section along the line 3—3 of FIG. 1.

As illustrated in FIGS. 1-3 of the drawings, a preferred embodiment of the device constituting this invention comprises a body having a rigid upper block-like member 10 and a rigid lower block-like member 12 attached to one another by screws 14 through an intermediate flexible seal 16. A cavity 18 in the upper member is in communication with a vacuum source (not shown) through a conduit 20. A plate-like anterior end wall 22 with a plurality of vacuum ports 24 extending therethrough is positioned within a recess in the upper member 10 at the base of cavity 18 and between the two block-like members 10, 12.

The lower member 12 has an included vacuum chamber 26 bounded on an anterior end by the anterior wall 22 and open at its other end for receipt of a film wrapping. The chamber 26 is in communication with the vacuum source through the vacuum ports 24 in the anterior end wall 22. The vacuum ports extend all about and to the outer edge of the wall as shown.

As explained below, and as should be obvious, the purpose of the vacuum source is to draw the film into the chamber and thereafter retain the film in suspension. Therefore it is desirable to have a screen or ported wall as shown that will adequately support the film against the pull of the vacuum without the film being damaged, as might occur, for example, if only a large singular opening for the vacuum were provided.

The vacuum chamber 26, which in the embodiment of FIGS. 1 to 3 is specifically configured for lifting an article such as a loaf of bread that has generally a rectangular upper surface, is formed by a a pair of long opposing diverging sidewalls 28 and a pair of comparatively short opposing sidewalls 30, defining a narrow rectangular opening or entrance at the base 32 of the chamber. Each of the two long sidewalls 28 diverge and slope outwardly, as best seen in FIG. 2, toward and to the outer edge of the anterior end wall 22, forming a diverging sidewall section between the diverging sidewalls.

The most inwardly protruding surface 34 of each diverging sidewall 28 is located at the base 32 of the chamber and extends radially inwardly of the outermost portion of the vacuum ports 24 that are above the respective sidewalls. The protruding surface 34 is smooth and rounded to receive and seal the film as it is pressed against it without damaging the film.

The anterior end wall is located at a predetermined distance adjacent to the chamber opening at the base 32 of the chamber, and the chamber is particularly sized to allow the film to be engaged within the chamber without being stretched beyond its elastic limit.

In addition, as shown in FIGS. 2 and 3, for the purpose of preventing the film being permanently wrinkled when the film is engaged within the vacuum chamber sidewalls 28, the corners 36 of the chamber are rounded and, at the base 32 of the chamber, the diverging walls are flared outwardly with a flare 38 and the short sidewall 30 is chamfered with a chamfer 40 leading from the outer edge of each sidewall 30 to the interior side of the sidewall adjacent the anterior end wall.

Although not shown, the device is intended to be bolted or otherwise attached to a conventional lifting and transporting mechanism for lifting the device and included article.

In FIG. 2, the device is illustrated with the vacuum chamber in typical engagement with a film wrapping 42 of a loosely wrapped article 44 such as a loaf of bread, as would occur when the article is being lifted by the device. In operation, when a vacuum is applied to the chamber through vacuum ports 24, and the base 32 of the chamber is brought into contact with the film wrapping, the film is drawn into the chamber against the anterior end wall 22 and over the diverging sidewalls 28 and short sidewalls 30 by the vacuum source. The vacuum source is then effectively sealed by the contact of the film with the anterior end wall and with the sidewalls 28, 30 of the chamber. As the article 44 is lifted and transported by the inventive device, the protruding surface 34 of each diverging sidewall 28 extends inwardly of a lineal path that the film would otherwise follow if permitted to suspend freely from the anterior end wall 22 without interference of the protruding surface. This causes the film to wrap toward and around each diverging sidewall as the film exits from the chamber, and the weight of the lifted article 44 forcibly urges the film into sealing contact with the protruding surface 34. Thus, owing to the construction of the sidewalls 28, the weight of the lifted article advantageously assists in maintaining the vacuum seal by pressing the film against the sidewalls rather than causing the seal to be broken by pulling or peeling the film away from the sidewalls. The diverging sidewalls 28 also function as a shelf to assist the vacuum source in supporting the suspended article.

In the embodiment described above, it was found not necessary to diverge the shorter sidewalls 30 because the film was adequately retained within the chamber by contact with the diverging sidewall 28. However, if the chamber walls were more uniform in size, it may be necessary to diverge all the sidewalls, similar to that described below for the second embodiment.

In accordance with conventional force vector analysis, the angle "a" of the film as it extends along the diverging sidewall 28 together with the angle "b" of the film as it exits from the vacuum chamber determines the angle of the resultant force vector that presses the film against the protruding surface 34 of the sidewall. The angle which the film exits from the chamber is determined by the configuration of the diverging sidewall 28, shape of the article, the extent to which the film is loosely wrapped about the article, and the amount of the film drawn into the vacuum chamber.

Through experimentation, it was found preferable to construct the vacuum chamber with a selected diverging sidewall angle "a" of between 20 to 30 degrees to support a film wrapping that when engaged by the chamber will exit the chamber at an angle "b" of approximately 60 degrees.

Figure 6:
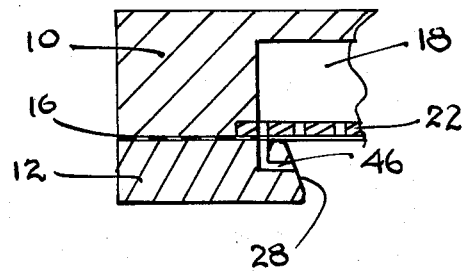
FIG. 6 is a cross-sectional fragmentary view of the vacuum chamber of FIG. 1 modified with additional vacuum ports extending into the vacuum chamber through the upper portion of the diverging sidewalls of the chamber.

Vacuum leakage at the outermost vacuum ports 24 along the periphery of the anterior end wall 22 and above the diverging sidewalls assists in retaining the film along the sloping sidewalls 28. The inventive device may be modified as shown in FIG. 6 with additional vacuum ports 46 extending from the cavity 18 to the upper portion of sidewalls 28 for this purpose.

Figure 4:
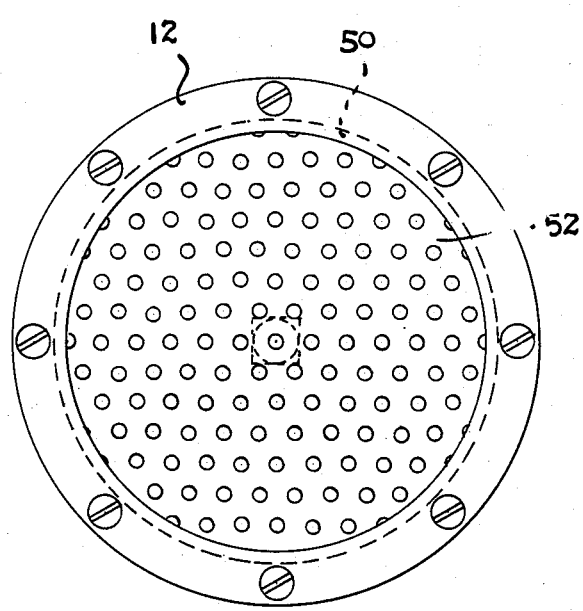
FIG. 4 is a bottom plan view of a second embodiment of the device constituting the invention.
Figure 5:
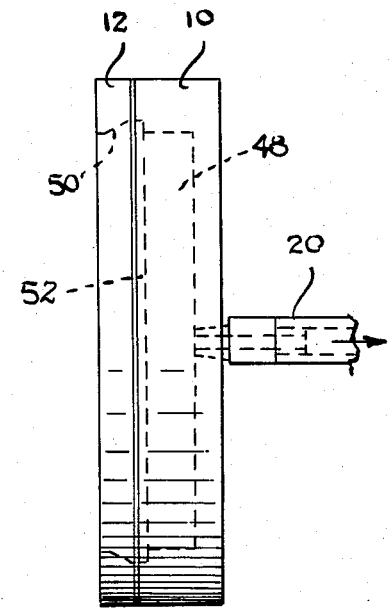
FIG. 5 is an end view of the device of FIG. 4.

A second embodiment of the invention is illustrated in FIGS. 4 and 5. In this embodiment, the construction of the device is generally as described for the first embodiment except that the device is formed with a vacuum chamber 48 that is cylindrical for lifting articles such as tortillas and the like which are round in shape, and the entire cylindrical sidewall of the chamber has a sloping sidewall 50 forming a diverging sidewall section along the entire periphery of the chamber adjacent to a ported anterior end wall 52.

The operation of inventive device of the second embodiment is the same as described for the first embodiment. The film of a film-wrapped article is retained within the chamber 48 by the vacuum source in communication with the chamber through the ports in the end wall, and the film as it exits the chamber is wrapped around the diverging sidewalls 50 in forcible sealing contact with the sidewalls to maintain a vacuum seal within the chamber, as previously explained.

While I have typically described a certain embodiment of my invention, it is of course to be understood that the invention is not limited to that embodiment or form, but rather is applicable broadly to numerous variations falling within the scope of the appended claims.

I claim:

1. A vacuum device for lifting an article loosely wrapped in flexible film comprising:
   (a) a body;
   (b) a vacuum chamber within said body for drawing the film within the chamber and for retaining the film and included article in suspension by a vacuum source;
   (c) said chamber having an anterior end wall, opposing sidewalls, vacuum communication means comprising ports in the anterior end wall for communication of the chamber with the vacuum source, and an opening opposite the anterior end wall for receiving the film within the chamber;
   (d) said ported anterior end wall and opposing sidewalls structured and positioned to have sealing contact with the film for substantially sealing the vacuum communication means when the film is drawn into the chamber by the vacuum source, and said anterior end wall being structured to support the film in suspension when the film and included article are retained in suspension by the vacuum source; and
   (e) said opposing sidewalls being positioned to interrupt a lineal path of the suspended film to cause the weight of the suspended article to maintain the contact of the film with the sidewalls when the film and included article are retained in suspension whereby the weight of the suspended article assists in maintaining the vacuum seal within the chamber.

2. The device of claim 1 wherein said vacuum ports are sized to prevent damage of the film when the film is received against the anterior end wall.

3. The device of claim 1 further including a rigid opposing sidewall section along the opposing sidewalls with the opposing sidewalls of the opposing sidewall section extending inwardly of an outermost portion of said vacuum communication means.

4. A vacuum device for lifting an article loosely wrapped in flexible film comprising:
   (a) a body,
   (b) a vacuum chamber within said body for drawing the film within the chamber and for retaining the film and included article in suspension by a vacuum source;
   (c) said chamber having an anterior end wall, opposing sidewalls, a rigid diverging sidewall section along the opposing sidewalls, a vacuum communication means comprising ports in the anterior end wall for communication of the chamber with the vacuum source, and an opening opposite the anterior end wall for receiving the film within the chamber;
   (d) said ported anterior end wall and diverging sidewall section positioned to have sealing contact with the film within the vacuum chamber for substantially sealing the vacuum communication means when the film is drawn into the chamber by the vacuum source, and said anterior end wall being structured to support the film when the film and included article are retained in suspension by the vacuum source; and
   (e) said diverging sidewall section formed by opposing sidewalls diverging toward the anterior end wall and being positioned to interrupt a lineal path of the suspended film to cause the weight of the suspended article to maintain the contact of the film with the diverging sidewalls when the film and included article are retained in suspension whereby the weight of the suspended article assists in maintaining the vacuum seal within the chamber.

5. The vacuum device of claim 4, wherein each opposing sidewalls of the diverging sidewall section extends below and inwardly of an outermost portion of said vacuum communication means.

6. The vacuum device of claim 5, wherein each opposing sidewall of the diverging sidewall section extends upwardly and terminates adjacent an outer edge of said anterior end wall.

7. The vacuum device of claim 4, wherein vacuum ports are also provided on each opposing sidewall of the diverging sidewall section for retaining the film on the sidewalls.

8. The vacuum device of claim 6, wherein the vacuum chamber is bounded by two long opposing sidewalls and two comparatively short opposing sidewalls, said long opposing sidewalls having the diverging sidewall section thereon, and the corners at the intersection adjacent each short end of the chamber opening being flared outwardly and each short sidewall being chamfered at the chamber opening for preventing the film from being permanently wrinkled when received within the chamber.

9. The vacuum device of claim 4, wherein the vacuum chamber is bounded by cylindrical opposing sidewalls with said diverging sidewall section being carried about the cylindrical opposing sidewalls.

10. A vacuum device in combination with an article loosely wrapped in flexible film suspended from the device comprising:
    (a) a body connected to a vacuum source;
    (b) a vacuum chamber within the body in communication with the vacuum source for drawing the film within the chamber and for retaining the film and included article in suspension by the vacuum source;
    (c) said chamber having an anterior end wall, opposing sidewalls, vacuum communication means comprising ports in the anterior end wall for communication of the chamber with the vacuum source, and an opening opposite the anterior end wall for receiving the film within the chamber;
    (d) said film being drawn into engagement with the anterior end wall and opposing sidewalls by the vacuum source and the engagement of the film with the anterior end wall and sidewalls substantially sealing the vacuum communication means;
    (e) said film being retained by the vacuum source in suspension against the anterior end wall and opposing sidewalls with the film extending through the opening of the chamber and with the included article being carried outside of the chamber; and (f) said opposing sidewalls interrupting a lineal path of the suspended film to cause the weight of the suspended article to maintain the contact of the film with the opposing sidewalls as the film exits from the chamber whereby the weight of the suspended article assists in maintaining the vacuum seal within the chamber.

11. The vacuum device of claim 10 further including a rigid opposing sidewall section along the opposing sidewalls with each opposing sidewall of the opposing sidewall section extending below and inwardly of an outermost portion of said vacuum communication means.

12. A method of maintaining a vacuum seal when suspending an article loosely wrapped in flexible film by a vacuum device having a vacuum chamber with an anterior end wall, communication means in the anterior end wall for communication of a vacuum source with the vacuum chamber, opposing sidewalls and an opening opposite the anterior end wall, comprising the steps of drawing the film into the vacuum chamber by a vacuum source, effectively sealing the chamber by contact of the film with the anterior end wall and opposing sidewalls when the film is drawn into the chamber, supporting the film and included article in suspension from the anterior end wall, and causing a lineal path of the suspended film to be interrupted by the opposing sidewalls for maintaining a forcible contact of the film with the sidewalls by the weight of the suspended article.

* * * * *